Oct. 15, 1957 M. MARTORELLO 2,809,755
SADDLE RACK FOR HORSE TRAILERS
Filed March 26, 1954 2 Sheets-Sheet 1
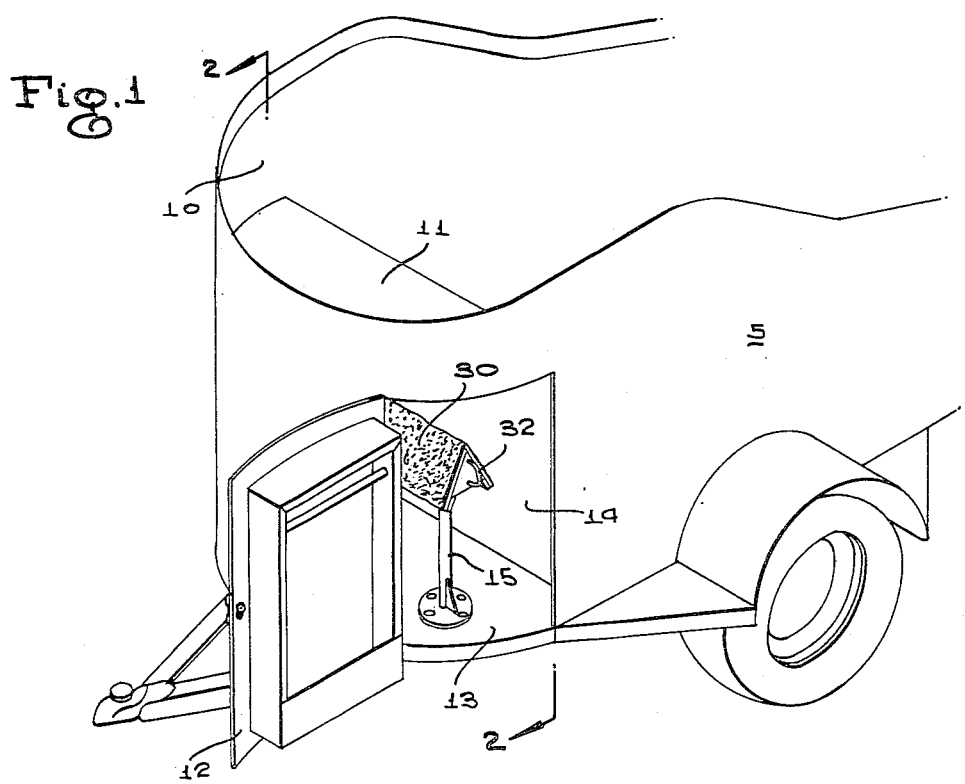
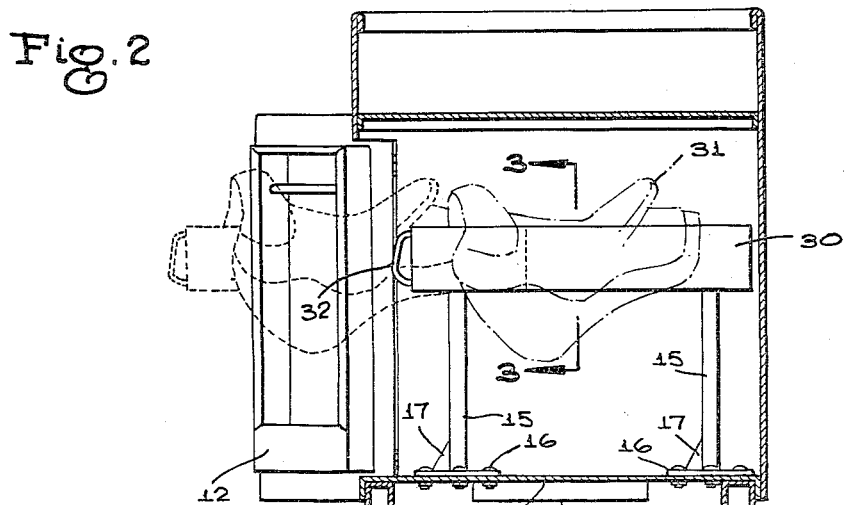
INVENTOR.
MICHAEL MARTORELLO
BY
McMorrow, Berman & Davidson
ATTORNEYS Oct. 15, 1957   M. MARTORELLO   2,809,755
SADDLE RACK FOR HORSE TRAILERS
Filed March 26, 1954   2 Sheets-Sheet 2
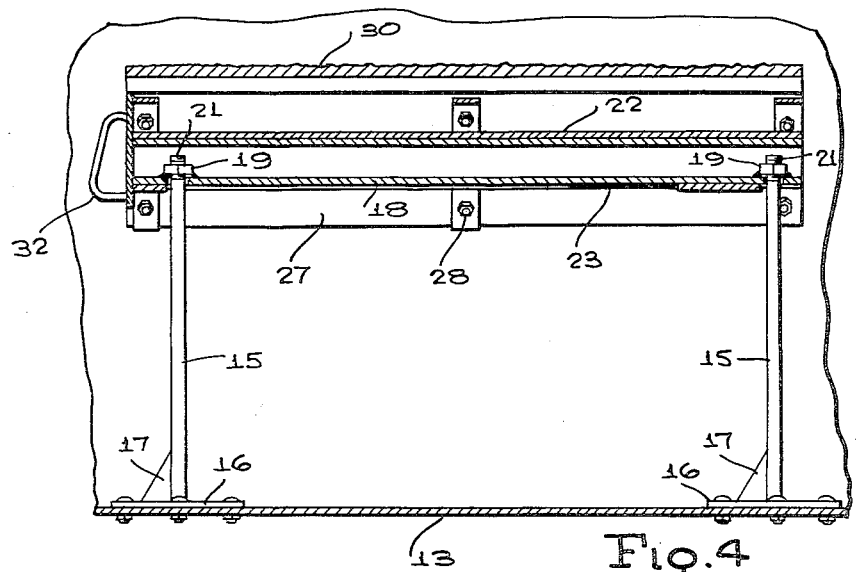
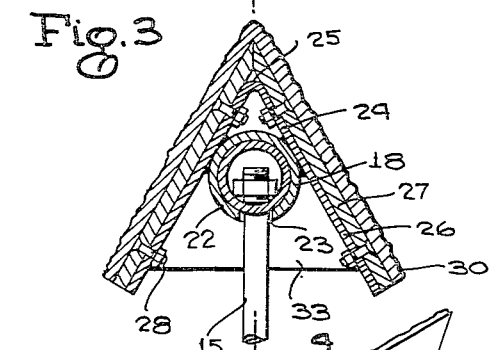
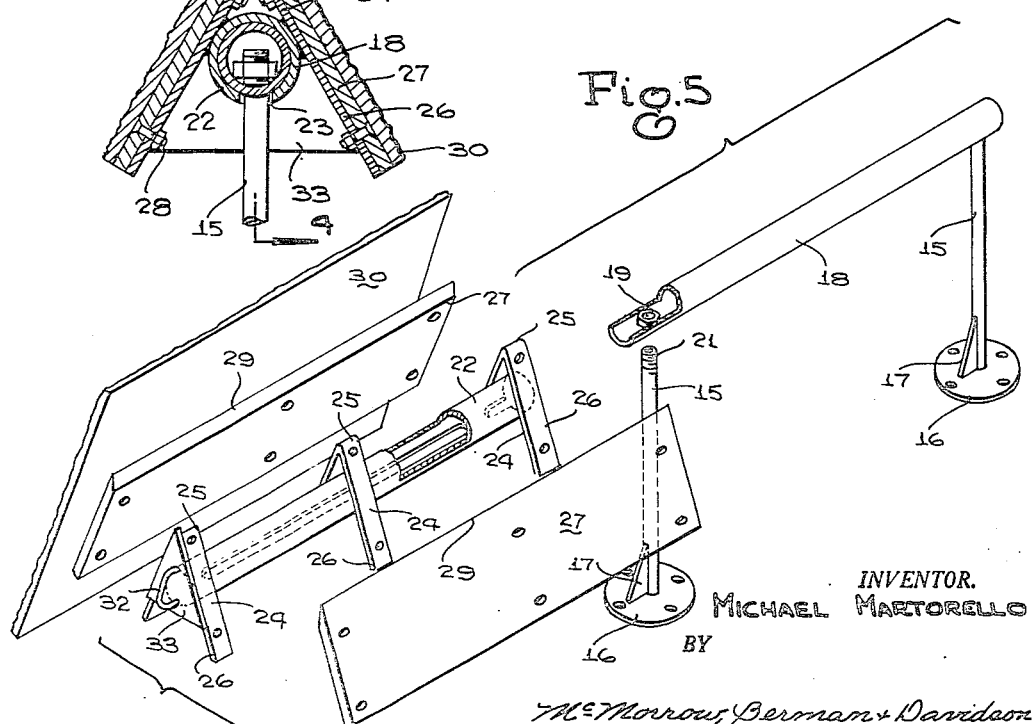
INVENTOR.
MICHAEL MARTORELLO
BY
McMorrow, Berman & Davidson
ATTORNEYS

United States Patent Office 2,809,755
Patented Oct. 15, 1957

2,809,755

SADDLE RACK FOR HORSE TRAILERS

Michael Martorello, Pittsburg, Calif.

Application March 26, 1954, Serial No. 418,899

3 Claims. (Cl. 211—13)

The present invention relates generally to horse vans or trailers of the kind having a small low ceiling compartment at the front thereof for the incidental storage of tack and duffel, which compartment is formed in space otherwise wasted due to the positioning of the hore in the trailer with its head facing forwardly and with its head and neck desirably kept over a shelf or bar as in a stall having a feed box.

The more recently developed horse vans or trailers have been designed with several views in mind, and are purposely made relatively narrow to accommodate one or two horses with substantially no room for sidewise movement of the horse within the trailer, the free movement of an animal on its legs in a truck or trailer having been found to be the cause of much trouble in steering and the cause of accidents. The trailers presently in use, in addition to being narrow, are most generally streamlined and have little available space for the storage of tack other than the forward end under the horse's head and neck.

The principal object of the present invention is to provide a device for stowing saddles within such limited space, and to provide a device or rack which will suspend a saddle properly without subjecting it to abrasive contact with other tack or gear.

Another object of the present invention is to provide a rack for saddles that is movable into and out of the compartment available in such a trailer described without sliding of the saddle on any surface in order that the underside of the saddle be protected from scuffing and marring.

A further object of the present invention is to provide a rack for saddles that may be dimensioned to use the uppermost portion of the compartment available in such a trailer, while other tack or gear less liable to scuffing and scratching may be piled beneath the rack, and be relatively undisturbed when the saddles are removed or replaced on the rack.

A still further object is to provide a rack having a suitable surface to prevent marring of the fine leathers of present day saddles used in the equestrian arts and one which is shaped to substantially support the saddles in their normal use position with hanging girth and stirrup straps, and one which assists materially in preserving the shape of the saddle during transport.

These and other objects and advantages of the present invention will be readily apparent from the following description when considered with the attached drawings, in which like numerals indicate like parts throughout the several views, and in which:

Figure 1 is a view in perspective of the front end of such a trailer as is in use for the transportation of horses between show events, showing the positioning of the present invention within the compartment provided, Figure 2 is a partial view in section showing the relative placement of the present invention within the compartment, Figure 3 is an end view in section taken on line 3—3 of Figure 2, Figure 4 is a side view in section taken on line 4—4 of Figure 3, and Figure 5 is an expanded view in perspective of the various parts of the present invention partially unassembled.

Referring in more detail to the drawing, in Figures 1 and 2 will be seen a horse van or trailer 5 at its front end with the space indicated at 10 forming a compartment as being normally used by the horse's head and neck; feed boxes may be installed there, although the shelf 11 is primarily desired in order that the horse be restrained from lowering its head for any purpose. The compartment has an opening which is closed by a door 12, while the trailer floor 13 extends thereunder and a wall 14 protects it from the horse's front legs.

As will be seen in Figures 1, 2 and 4, the invention consists of a pair of legs 15 having flanges 16 at their lower ends bolted to the trailer floor within the compartment, the flanges 16 being suitably braced by angle pieces 17. A first elongated support member 18 of tubular steel or other metal has a nut 19 welded over a hole in each end into which the threaded end 21 of each leg 15 is screwed. A second elongated tubular support member 22 has a slot 23 on its underside so that it may slide at least one way on the first support member 18. Brackets 24, in this embodiment shown to be V-shaped are secured by welding or other means to the second support member 22 with their apexes 25 uppermost and with their arms 26 depending one on each side of the support members. A board or plate 27 is secured to each of the brackets on one side by counter-sunk bolts 28 and is chamfered along its upper edge 29 so that it meets the other board in face to face relation at the apex of the brackets.

As shown in Figures 1 and 3, the plates 27 are covered with carpeting 30 or other pile fabric preferably, although any resilient fabric or material such as foam rubber may be equally desirable to prevent scuffing of the saddle indicated at 31 in Figure 2. A handle 32 is provided and is secured to the second support member 22 by means of a plate 33 of triangular shape welded or otherwise fixed to the end of the second support member and to the end one of brackets 24, as most clearly shown in Figure 5. The handle 32 is of course fixed to the end of the second support member adjacent the leg 15 which is received in the slot 23, in order that the second support member 22 may be pulled out of the compartment as seen in dotted lines in Figure 2 so that the saddle may be easily placed thereon.

It will be readily understood that the legs of the invention should be of such height that the saddles are held as high as possible and near enough to the bottomside of the shelf 11 to prevent accidental bouncing off the rack if the trailer should strike a bump. Also, the higher the rack is positioned within the compartment the more space is left for other storage beneath the rack on either side of the legs. The V-shape of the rack, as here illustrated, is only one of many shapes that may be used, but has been found adequate for the preserving of the normal shape of the saddle and permits either natural hanging of the girth and stirrup straps, or the straps may be folded behind the saddle and crossed over the rack.

While a single embodiment of the present invention has been here described and illustrated, it is contemplated that many changes and modifications may be made without departing from the spirit and scope of the invention as set forth in the appended claims.

What is claimed is:

1. A saddle rack comprising an elongated first support member, vertically depending support legs secured at each end of said first support member, a second support member longitudinally disposed on said first support member and slidable thereon, V-shaped brackets secured to said second support member and having their apices uppermost with an arm depending on each side of said second support member, a plate secured to said arms on each side of said second support member, said plates having their upper edges disposed in meeting relation at the apices of said brackets, and guide means on said second support member operable to restrain rotary movement on said first support member, said plates being adapted for receiving saddles thereon.

2. A saddle rack comprising an elongated first support member, vertically depending support legs secured at each end of said support member, a second support member longitudinally disposed on said first support member and slidable thereon, said second support member having a slot on its underside for substantially its whole length and receiving one of said legs therein, V-shaped brackets secured to said second support member with their apices uppermost and having their arms depending one each on each side of said second support member, an elongated plate secured to said arms on each side and being horizontally disposed with the upper edge of each in face to face relation, a resilient covering on said plates on their outer surfaces, and a handle secured to said second support member at the one end adjacent the one of said legs received in said slot.

3. A saddle rack comprising an elongated tubular first support member, vertically depending legs secured at each end of said first support member, a second tubular support member longitudinally disposed on said first support member and slidable thereon, said second support member having a slot on its underside for substantially its whole length and receiving one of said legs therein, V-shaped brackets secured to said second support member with their apices uppermost and having their arms depending one each on each side of said second support member, an elongated plate secured to said arms on each side and being horizontally disposed with the upper edge of each in face to face relation, a resilient covering on said plates on their outer surfaces, and a handle secured to said second support member at the one end adjacent the one of said legs received in said slot.

References Cited in the file of this patent

UNITED STATES PATENTS

D. 149,786     Arisman _____ June 1, 1948